(12) United States Patent
Silva Valente

(10) Patent No.: US 7,988,864 B2
(45) Date of Patent: Aug. 2, 2011

(54) PROCESS AND DEVICE FOR SEPARATION OF LIQUIDS EMULSIFIED IN MIXTURES OF LIQUIDS AND GASES DISSOLVED IN MIXTURES OF LIQUIDS AND GASES BY LOCALIZED PRESSURE REDUCTION

(75) Inventor: Antonio Jose Silva Valente, Quinta do Conde (PT)

(73) Assignee: Partex Services Portugal-Servicos Para A Industria Petrolifera, S.A., Lisboa (PT)

( * ) Notice: Subject to any disclaimer, the term of this patent is extended or adjusted under 35 U.S.C. 154(b) by 619 days.

(21) Appl. No.: 11/996,755

(22) PCT Filed: Jul. 25, 2006

(86) PCT No.: PCT/PT2006/000019
§ 371 (c)(1),
(2), (4) Date: Jan. 25, 2008

(87) PCT Pub. No.: WO2007/013829
PCT Pub. Date: Feb. 1, 2007

(65) Prior Publication Data
US 2008/0223796 A1 Sep. 18, 2008

(30) Foreign Application Priority Data
Jul. 26, 2005 (PT) .......................... 103325

(51) Int. Cl.
*B01D 17/04* (2006.01)
(52) U.S. Cl. .............. 210/708; 95/253; 95/260; 95/263; 96/184; 96/218; 210/180; 210/187; 210/209; 210/218; 210/512.1; 210/519; 210/521; 210/774; 210/788; 210/801; 196/46; 208/185; 208/187

(58) Field of Classification Search .................. 210/121, 210/180, 187, 188, 194, 195.1, 209, 218, 210/259, 512.1, 512.2, 519, 521, 538–540, 210/703, 708, 737, 738, 774, 787, 788, 800, 210/801, 804–806, 808; 95/253, 258, 260, 95/267, 271; 96/184, 204, 209, 218; 208/184, 208/185, 187; 196/46, 46.1; 095/263
See application file for complete search history.

(56) References Cited

U.S. PATENT DOCUMENTS
1,702,612 A * 2/1929 Morse ........................... 210/187
(Continued)

FOREIGN PATENT DOCUMENTS
GB 103 710 2/1917
(Continued)

*Primary Examiner* — Joseph W Drodge
(74) *Attorney, Agent, or Firm* — Oblon, Spivak, McClelland, Maier & Neustadt, L.L.P.

(57) ABSTRACT

A process and a device implementing the process, for separating fluids in emulsion and/or in solution, and/or for low pressure distillation, in particular of water and/or gaseous hydrocarbons dissolved in crude petroleum, and/or for separation of crude petroleum droplets emulsified in water, to obtain water with necessary characteristics for its injection without pollution of underground aquifers, and/or when the mixture is dominant in crude petroleum, acceleration of settling of the water in the lower part of the mixture, and/or for low pressure distillation of crude petroleum. The method creates a localized zone of reduced pressure on part of the free surface of a liquid to be processed, within a closed processing tank, without the overall pressure inside the closed processing tank being affected.

19 Claims, 7 Drawing Sheets

U.S. PATENT DOCUMENTS

| | | | | |
|---|---|---|---|---|
| 2,047,989 A | * | 7/1936 | Woelflin | 516/139 |
| 3,860,492 A | | 1/1975 | Lowi, Jr. et al. | |
| 3,951,816 A | * | 4/1976 | Bascope et al. | 210/519 |
| 4,094,783 A | * | 6/1978 | Jackson | 210/703 |
| 4,876,016 A | | 10/1989 | Young et al. | |
| 5,171,455 A | * | 12/1992 | Wang et al. | 210/744 |
| 5,240,617 A | * | 8/1993 | Hopf | 210/703 |
| 6,337,023 B1 | * | 1/2002 | Broussard et al. | 210/703 |
| 6,409,808 B1 | | 6/2002 | Chamberlain et al. | |
| 6,537,458 B1 | * | 3/2003 | Polderman | 210/801 |
| 6,749,757 B2 | * | 6/2004 | Smith et al. | 210/703 |

FOREIGN PATENT DOCUMENTS

GB  2 035 150  6/1980

* cited by examiner

US 7,988,864 B2

PROCESS AND DEVICE FOR SEPARATION OF LIQUIDS EMULSIFIED IN MIXTURES OF LIQUIDS AND GASES DISSOLVED IN MIXTURES OF LIQUIDS AND GASES BY LOCALIZED PRESSURE REDUCTION

BACKGROUND OF THE INVENTION

1. Field of the Invention

The present invention refers to a process for separation of fluids in emulsion and/or in solution, and/or for low pressure distillation of fractions of same, and to the device for implementing the process. The separation of the fluids will be done by locally reducing the relative pressure on a particular part of the free surface of the liquids, the process making possible the degasification and separation of the liquids contained in a closed processing tank, without affecting the service pressure prevailing inside the processing tank.

2. Discussion of the Background

The separation as stated above, in accordance with the background art, is done by applying a partial vacuum to the processing equipment in its entirety and not just to a part of its interior.

Also according to the background art, in the case of large processing tanks, the costs of construction and installation of the same so as to withstand negative pressures are elevated, and what is more there is always the risk of vacuum-induced collapse and explosion due to fuel getting in.

Moreover according to the background art, the hydrocarbon processing industry is quite familiar with two or three phase separators, which operate on the basis of the Stokes law, these being used for the separation of liquids in emulsion and gases in solution, such separation being relatively slow.

SUMMARY OF THE INVENTION

One object of the present invention is to do away with the above drawbacks, by providing a process based on the Bernoulli laws, according to which a fluid in moving over a surface brings about a pressure reduction at the surface, one conspicuous example of its application being the creation of lift on the wings of aircraft, in that the pressure reduction at the upper surface or extrados of the wing is greater than the pressure reduction on the lower surface or intrados of the wing, owing to the more convex profile (the extrados) of the former, which forces the air to move more quickly on this one than on the intrados, thereby producing, thanks to the pressure difference at the two surfaces, a force directed upward, providing the lift characteristic of the wing.

Consequently, the present invention applies the principle of pressure reduction with increase in velocity of a gas moving over a surface and tangentially to the same, so that, in the processing device where this localized pressure reduction is generated, there is encouraged a separation of fluids in emulsion and/or in solution, and/or a low pressure distillation of the components of the fluid, the evaporated components afterwards being processed and recovered.

A current of gas projected onto and tangentially to a free surface of a liquid will bring about a pressure reduction at the area of contact between the gas and the liquid, as described above, creating the conditions for the components with less vapor pressure to gradually separate from the liquid, as well as a faster migration to the surface of the dissolved gases and of the liquid in emulsion with less specific gravity.

According to the invention, the localized pressure reduction at the particular part of free surface of the liquid is achieved by projecting a current of gas against the particular part of the free surface and tangentially to same, and the current of processing gas before making contact with the free surface makes an angle which can vary between zero and thirty degrees. Preferably, the angle is five degrees.

The processing gas which is projected onto the surface is a gas compatible with the liquid contained in the processing tank or an inert gas, so as to eliminate any risks inherent to the nature of the liquid, such as fire, pollution, explosion, etc.

The gas current can be applied in a particular part of the free surface of a liquid contained in a closed processing tank or it can be applied on a specific surface over which the liquid will flow so as to increase the area/volume ratio and thus the separation yield and the volume of liquid being processed. In this case, the surface can be planar or assume any other adequate shape for the intended purpose, preferably the shape of the extrados of an aircraft wing.

Therefore, one way of improving the process of the present invention is to use a platform on whose surface the liquid to be processed flows, so as to increase the area/volume ratio of liquid on the free surface of the platform, and to project a current of gas onto the surface tangentially, the current of processing gas making a certain angle before it comes into contact with the free surface, which can vary between zero and thirty degrees, the angle being preferably five degrees. In accordance with what has just been noted, such a platform preferably will have the shape of the extrados of an aircraft wing.

The generating of a localized pressure reduction inside a closed processing tank on the particular part of free surface of the liquid by projecting a the current of processing gas against and tangentially to the same, the current of processing gas making a particular angle before coming into contact with the surface, in accordance with the present invention, is novel with regard to the background art.

The present invention can be applied especially to petroleum products, without restricting its application to other fluids and, in particular, to the separation of water in emulsion and gases in solution in crude petroleum or in its subproducts, and/or to distillation of fractions of crude petroleum or its subproducts, by a pressure reduction on a particular part of the surface of the crude petroleum, or its subproduct, without generating a partial vacuum or excess pressure in the internal environment of the processing tank or receptacle, being therefore more efficient in terms of process speed, energy consumption, cheapness and safety, than background processes for the same purpose.

One case illustrating the present invention is a closed processing tank, inside which the pressure is reduced in only one particular part of the free surface of the liquid, by the projecting of a current of processing gas against the part of free surface of the liquid, thereby generating a pressure reduction in the zone of contact between the part of free surface of the liquid and the current of processing gas, such that the range of influence of the reduced pressure does not affect the general pressure inside the tank, which does not undergo any reduction, and therefore no outside gases are admitted into the tank, with the accompanying risk of formation of flammable mixtures, an explosion.

One application of the process of the present invention involves the separation of crude petroleum, coming from the production wells, from the water which it contains in emulsion and from part of the gas in solution in same. The crude petroleum, stored within a processing tank, will be made to flow over a platform, arranged for this purpose inside the tank at a certain distance above the free surface of the crude petroleum, which may or may not be heated, against which there is made to impinge a current of gas onto the free surface of the crude petroleum in movement on the platform and tangentially to the surface, the current of gas making an angle before impinging on the surface, which may vary between zero and thirty degrees, the angle preferably being five degrees, bringing about a pressure reduction on the free surface, and the crude petroleum being continually recirculated, until one has achieved a substantial migration of the water to the bottom of the receptacle, from which it is drained, and the liberation of the gases in solution in the crude petroleum, and the desired final product is obtained, namely, crude petroleum with lesser percentage of water and stabilized at the required temperature by degasification. It is within the scope of the invention to arrange several other platforms placed in series within the processing tank.

Another application of the process of the present invention includes the separation of the water coming from the abovementioned processing from the residual hydrocarbons so that it can be injected, upon reaching a concentration of hydrocarbons on the order of 15 parts per million or less, into the subsoil without polluting the existing paretic zones with such hydrocarbons, the water being subjected to a processing equal to that of the preceding paragraph. Thanks to the pressure reduction on the platform, the droplets of crude petroleum and the gases lighter than water tend to evaporate and will either be entrained by the current of gas or will emerge onto the surface for subsequent decanting.

It is within the scope of the invention that the projecting of a current of processing gas is done either in opposite current or concurrent manner.

It is also within the scope of the invention that the process of the present invention can be done inside a hydrocyclone. As is known, hydrocyclones make possible, for a particular volume of equipment, a greater area of contact with a current of processing gas. The processing gas is projected against the crude petroleum, containing water and gas, which upon being centrifuged against the walls of the hydrocyclone during the centrifugation process inside the hydrocyclone, creates an interior free surface of truncated conical shape, with the hydrocarbons being closer to the axis and the water to the walls. The current of processing gas is then projected onto and tangentially to this surface with an annular shape, the current of processing gas making an angle before coming into contact with the surface, which can vary between zero and thirty degrees. Preferably, the angle is five degrees. In this way, one obtains a cylindrical contact surface between the gas and the liquid, which allows one to apply the process of localized pressure reduction on a greater surface for a particular equipment volume. The hydrocyclone can be installed independently or it can be an integral part of the processing equipment.

It is also within the scope of the invention to carry out the process within an independent apparatus or one inserted within processing equipment such as, without being restricted hereto, storage tanks, dehydration and degasification tanks, and phase separators.

It is also within the scope of the invention to use Venturis in order to create the localized partial vacuum on a surface. As is known, Venturis are static machines used for the movement of fluids, which exploit the partial vacuum created by the application of a driving fluid.

The aspiration brought about by the Venturi will create a movement of gas present in the process apparatus, which in moving over the free surface of the liquid will bring about a localized pressure reduction in this area.

The processing gas, after passing over the free surface of the liquid, is saturated with the components removed from same and it will be processed thereafter, in order to separate these components via an exchanger, which cools down the gas and condenses the separated gases, which will be taken outside of the apparatus for subsequent processing. The depleted gas will return to the processing apparatus and be used again as the processing gas, perhaps with addition, when necessary, of another processing gas. Any overall pressure rise due to operating abnormality is controlled by a properly calibrated and fast-opening safety valve.

The process of the invention is energy-efficient when compared to the existing alternatives, since it only moves the quantity of gas necessary to obtain a localized partial vacuum, and the processing apparatus does not need to be designed for negative pressures.

The present invention also refers to the devices used to implement the process.

BRIEF DESCRIPTION OF THE DRAWINGS

The characteristics and additional aspects of the invention will be better understood by reading the description of preferred embodiments of the invention, furnished as illustrative but not limiting examples and shown on the attached drawings, in which.

DESCRIPTION OF THE PREFERRED EMBODIMENTS

Figure 1:
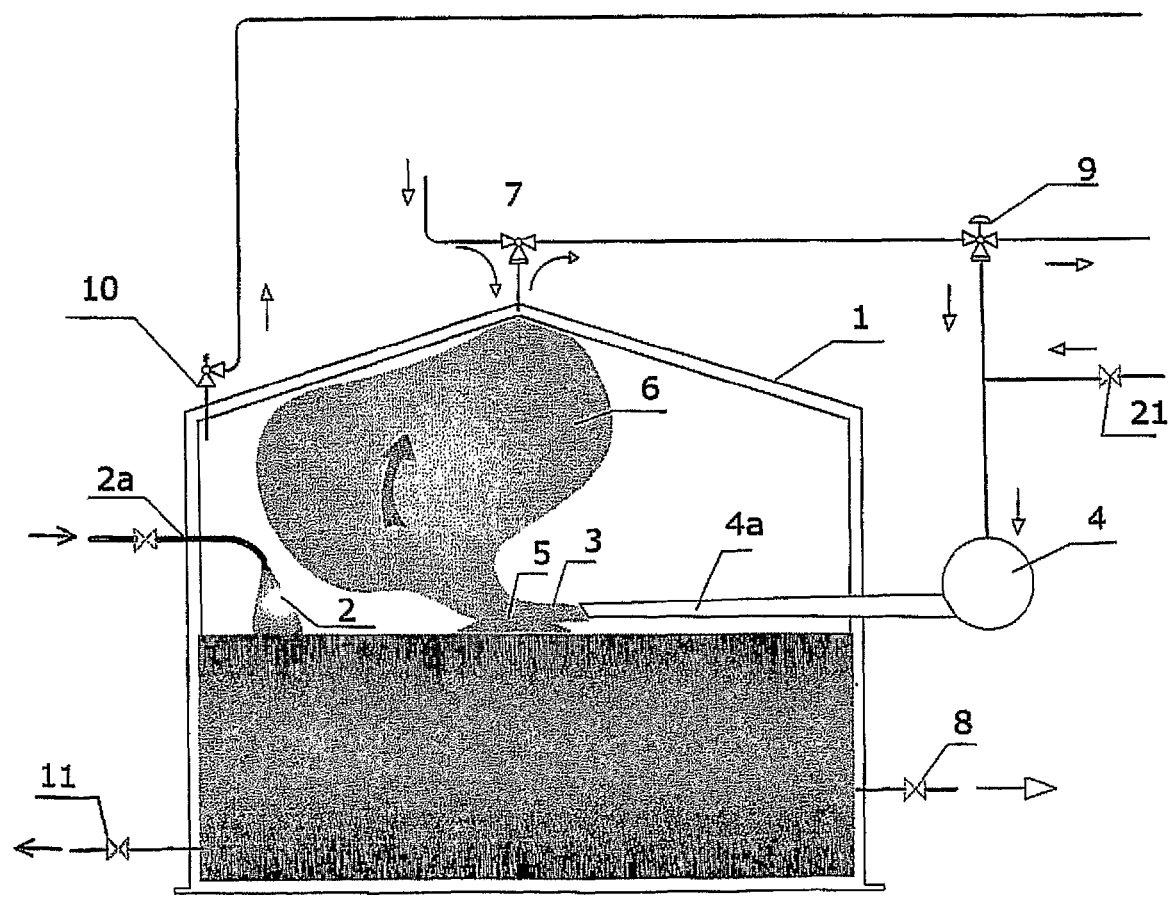
FIG. 1 shows a simplified schematic view in cross section of a processing tank in which the theoretical process of the invention is carried out.

FIG. 1 shows one theoretical way of implementing the process according to the invention, in which the crude petroleum with water in emulsion and dissolved gas, that is, the crude petroleum to be processed 2, is introduced into the closed processing tank 1 where the crude petroleum will be stored, via the inlet pipe 2a, until the time when it leaves, after processing, via the outlet pipe 8, in static or dynamic manner (that is, the crude petroleum 2 enters the tank simultaneously with the leaving of the already processed crude petroleum). The processing gas 3 is compressed by a compressor 4, a current of processing gas 3 being projected, via an injector 4a, onto and tangentially to the free surface of the crude petroleum, the current of processing gas 3 making a particular angle with the free surface of the crude petroleum before reaching the surface, which can vary between zero and thirty degrees, the angle preferably being between 0 and 8 degrees, but preferably five degrees. In the zone of influence of the current of processing gas 3 there is created a localized zone of reduced pressure 5 on the surface of the crude petroleum. The compressor 4 is fed by the actual gas present in the tank or by a compatible gas arriving from the outside by the pipe 21, or by a mixture of same.

In the localized zone of reduced pressure 5, the gas and water in emulsion will separate from the crude petroleum 2 with a speed that depends on the velocity of the processing gas 3, which creates the localized zone of reduced pressure 5 on the interface with the crude petroleum being stored, and a gaseous mixture 6 is formed, which leaves the tank by the pressure regulating valve 7, being able to go directly on to further processing or return in whole or in part via a three-way control valve 9.

The gas above the free surface of the crude petroleum will be maintained at the service pressure prevailing inside the closed processing tank 1, by the action of the pressure regulating valve 7 and the overpressure rapid relief valve 10, which is the current practice in the oil industry.

The water separated will drop slowly by gravity to the bottom of the tank and will be drained in usual manner into the storage tanks of the oil industry by the bottom pipe 11.

The degasified and dehydrated oil will leave the closed processing tank 1 by the outlet pipe 8 for further processing or exporting.

Figure 2:
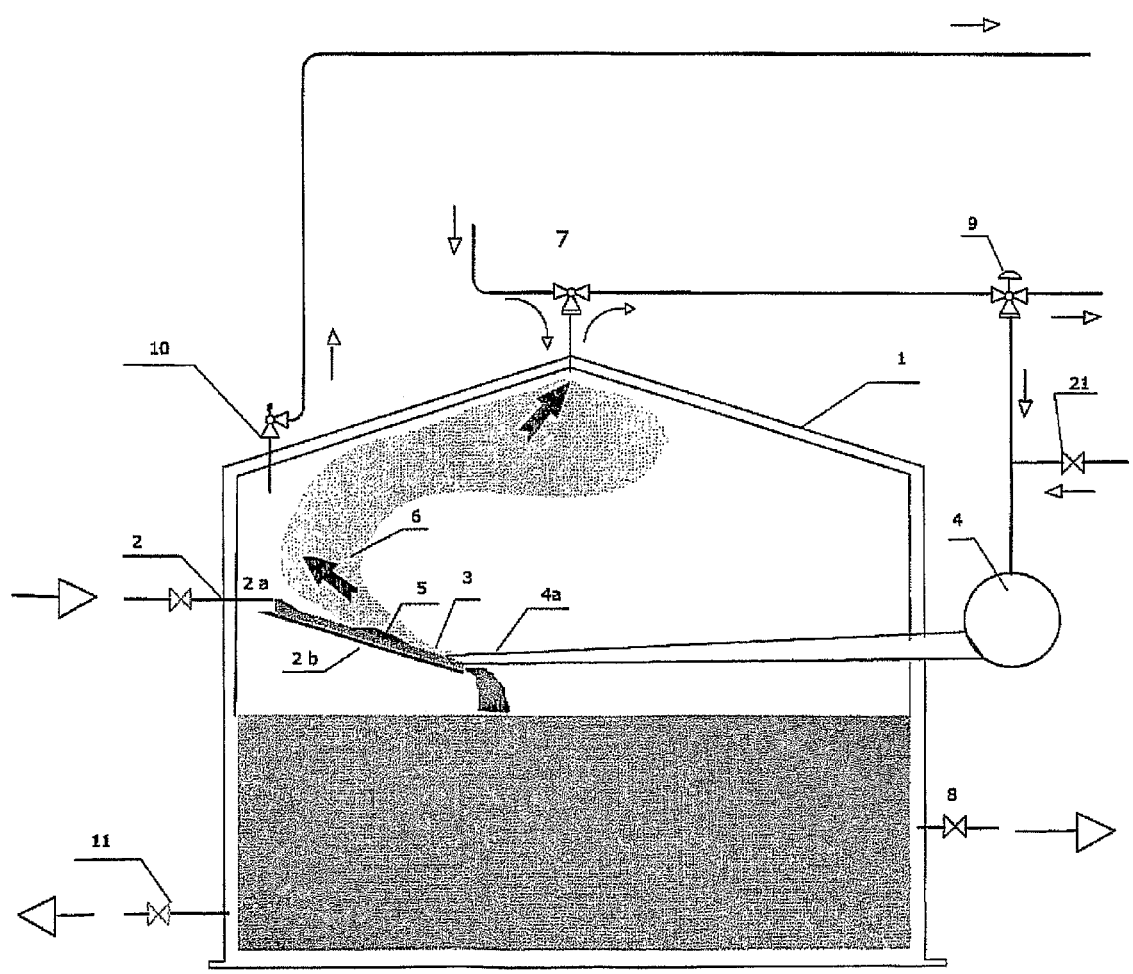
FIG. 2 shows another simplified schematic view in cross section of a processing tank in which the theoretical process of the invention is carried out.

FIG. 2 shows another theoretical way of implementing the process, in which the crude petroleum with water in emulsion and dissolved gas, that is, crude petroleum to be processed 2, is introduced into a closed processing tank 1 by the inlet pipe 2a, being sprinkled over a plate 2b. The crude petroleum is stored until the time it leaves through the outlet pipe 8, in static or dynamic manner. The processing gas 3 is compressed by a compressor 4, a current of the processing gas 3 being projected via the injector 4a onto and tangentially to the free surface of the crude petroleum, the current of the processing gas 3 making a particular angle with the free surface of the crude petroleum on the plate 2b, before reaching the surface, which angle may vary between zero and thirty degrees, the angle being preferably between 0 and 8 degrees, but preferably five degrees. The compressor 4 is fed by the actual gas present in the tank or by compatible gas coming from the outside, or by a mixture of same.

In the localized zone of reduced pressure 5, the gas and water in emulsion will separate from the crude petroleum 2 with a speed that depends on the velocity of the processing gas 3, which creates the partial vacuum on the interface with the crude petroleum being stored, and a gaseous mixture 6 will be formed, which will leave the tank 1 by the pressure regulating valve 7, being able to go directly on to further processing or return in whole or in part via a three-way control valve 9.

The gas above the free surface of the crude petroleum will be maintained at the service pressure prevailing inside the closed processing tank 1, by the action of the pressure regulating valve 7 and the overpressure rapid relief valve 10, which is the current practice in the oil industry.

The water separated will drop slowly by gravity to the bottom of the tank and will be drained in usual manner into the storage tanks of the oil industry by the bottom pipe 11.

The degasified and dehydrated oil will leave the closed processing tank 1 by the outlet pipe 8 for further processing or exporting.

Figure 3:
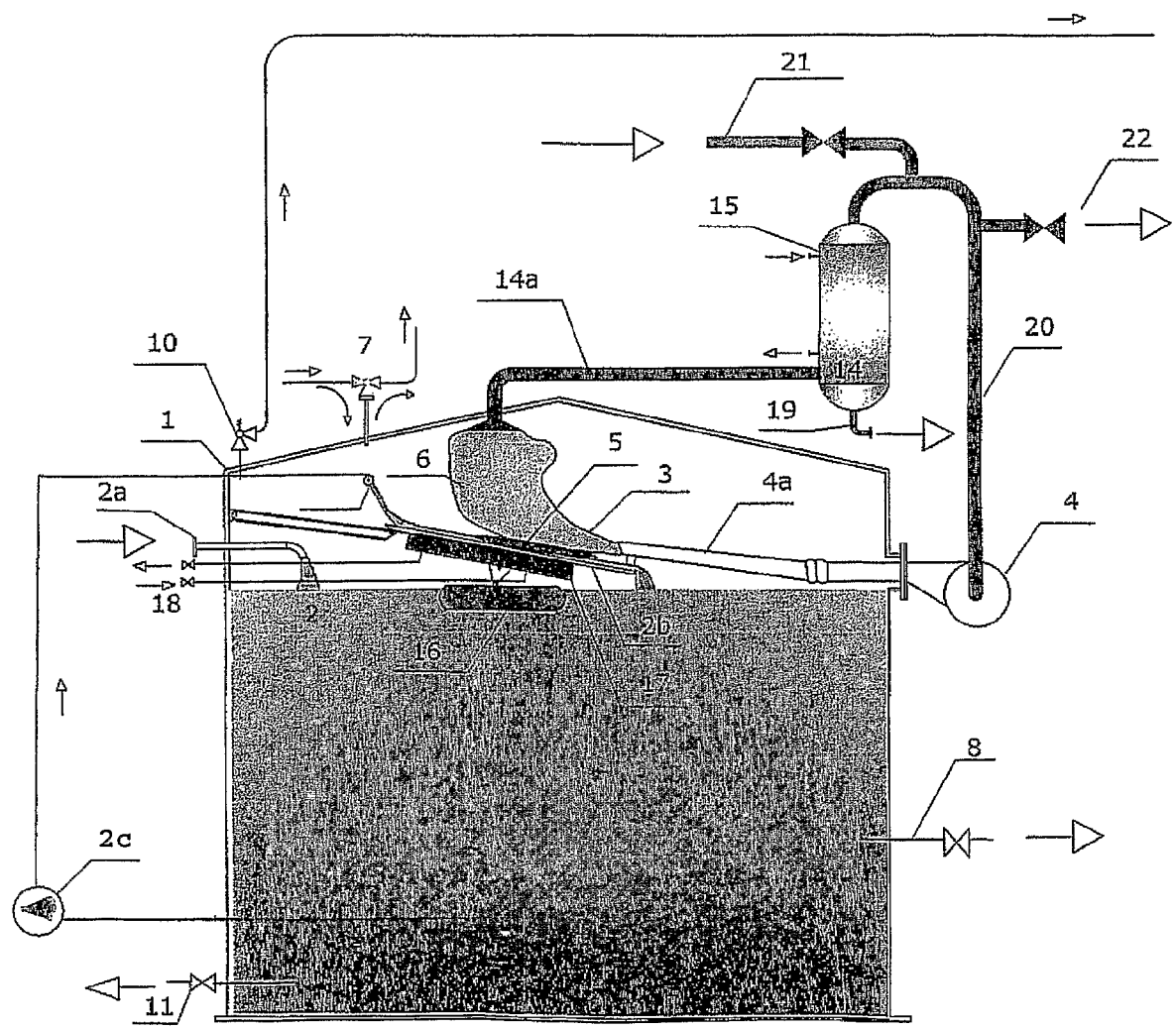
FIG. 3 shows a schematic view in partial cross section of an installation to carry out the process according to the present invention.

FIG. 3 shows in schematic fashion a processing installation for dehydration and degasification of crude petroleum with water in emulsion and dissolved gas, that is, crude petroleum to be processed 2, which is introduced into the closed processing tank 1 by the inlet pipe 2a. The crude petroleum 2 is compressed by a pump 2c, goes through a flexible articulated tube 2d and is sprinkled over a plate 2b, both the plate and the flexible articulated tube 2d being supported in a float 16, which makes it possible to follow the changes in level in the closed processing tank 1. The crude petroleum, once processed, is stored until the time of its leaving via the outlet pipe 8, in static or dynamic manner.

The processing gas 3 is compressed by a compressor 4, a current of the processing gas 3 being projected via the injector 4a onto and tangentially to the free surface of the crude petroleum, the current of the processing gas 3 making a particular angle with the free surface of the crude petroleum above the plate 2b, before reaching the surface, which angle can vary between zero and thirty degrees, the angle being preferably between 0 and eight degrees, but preferably five degrees. The injector 4a is also joined and connected to the plate 2b, so that it can follow the level of the crude petroleum in the tank 1.

The compressor 4 is fed by the gas present in the tank after it circulates through the exchanger 14, with addition, adding if necessary, of compatible gas 21 coming from the outside. The exchanger 14 receives the gaseous mixture 6 through the pipe 14a, which is cooled by an outside refrigerant 15. The condensates of the exchanger 14 are sent on through the pipe 19 for subsequent processing, while the gas coming from the exchanger 14 is aspirated by the compressor 4 and supplied to the tank, its being possible to add, as already mentioned, when necessary, a compatible gas 21 coming from the outside, or if the gas liberated in 5 is excessive, this excess can be exported for subsequent processing.

One can also provide for a heating of the plate 2b, by a heat exchanger 17, which will accelerate the processing and, thus, the separation of the water in emulsion and dissolved gases. The heat exchanger 17 is supplied with an outside heating fluid 18.

The gas above the free surface of the crude petroleum will be maintained at the service pressure prevailing inside the closed processing tank 1, by the action of the pressure regulating valve 7 and the overpressure rapid relief valve 10, which is the current practice in the oil industry.

The water separated will drop slowly by gravity to the bottom of the tank and will be drained in usual manner into the storage tanks of the oil industry by the bottom pipe 11.

The degasified and dehydrated oil will leave the closed processing tank 1 by the outlet pipe 8 for further processing or exporting.

Figure 4:
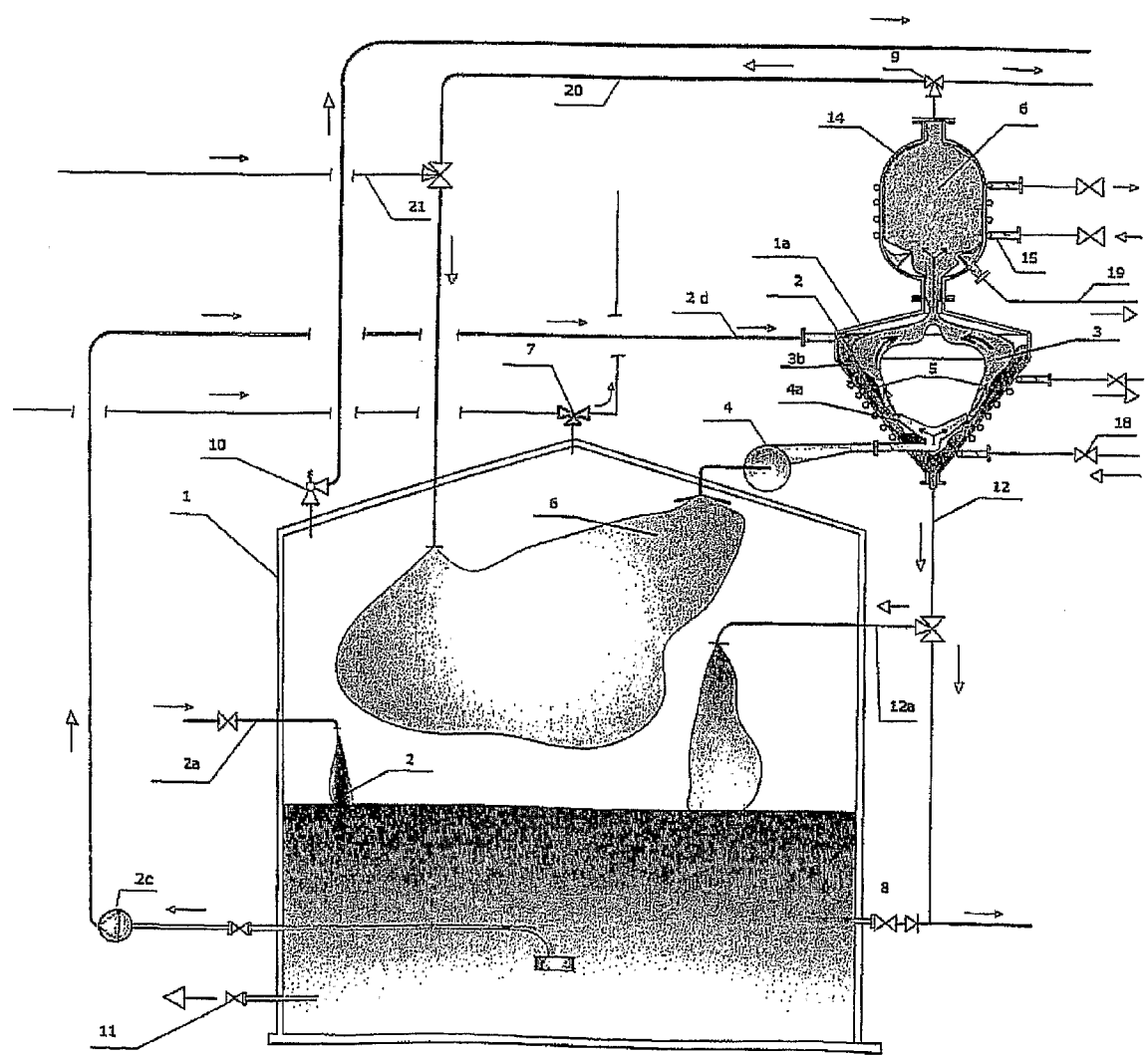
FIG. 4 shows a schematic and partial cross sectional view of an installation which includes a hydrocyclone to carry out the process according to the present invention.

FIG. 4 shows in schematic fashion a processing installation for dehydration and degasification of crude petroleum with water in emulsion and dissolved gas, that is, crude petroleum to be processed 2, which is introduced into the closed processing tank 1 by the inlet pipe 2a, the crude petroleum 2 being compressed by the pump 2c, via the pipe 2d going to a hydrocyclone 1A.

The outer wall of the hydrocyclone 1A can be heated by any adequate device.

The centrifugal force inside the hydrocyclone 1A will cause the crude petroleum to be dispersed in a truncated conical surface 3b. The processing gas 3 is compressed by a compressor 4, having an injector 4a, with an annular outlet surface, which latter projects a current of the processing gas 3 onto and tangentially to the free surface of the crude petroleum 2, which makes a particular angle with it, before reaching the surface, which angle can vary between zero and thirty degrees, the angle preferably being between 0 and 8 degrees, but preferably five degrees. A localized zone of reduced pressure 5 is than created, where the subsequent separation of the water in emulsion and the gas dissolved in the petroleum will take place.

The processing gas 3, which creates the localized zone of reduced pressure 5, together with separated hydrocarbons and/or evaporated water, forms the gaseous mixture 6.

The exchanger 14 receives the gaseous mixture 6 directly from the hydrocyclone 1A, which is cooled by an outside refrigerant 15. The condensates of the exchanger 14 are taken by the pipe 19 for subsequent processing. The gas coming from the exchanger 14 is taken by the pipe 20 to the tank 1, its being possible to add, if necessary, compatible gas 21 coming from the outside, or it can be exported for subsequent processing (three-way valve 9). This gas repeatedly will continue its compression process through the compressor 4 and it will return to the hydrocyclone 1A.

The degasified and dehydrated oil will leave the hydrocyclone 1A through the outlet pipe 12 and return 12a to the closed processing tank 1, from which it will leave by the outlet pipe 8 for further processing or exporting or it will go on directly for subsequent processing or export 12b.

The gas above the free surface of the crude petroleum will be maintained at the service pressure prevailing inside the closed processing tank 1, by the action of the pressure regulating valve 7 and the overpressure rapid relief valve 10, which is the current practice in the oil industry.

If there is any water separated by gravity within the tank, it will fall slowly by gravity to the bottom of the tank and it will be drained in customary fashion into the storage tanks of the oil industry, by the bottom pipeline 11.

Figure 5:
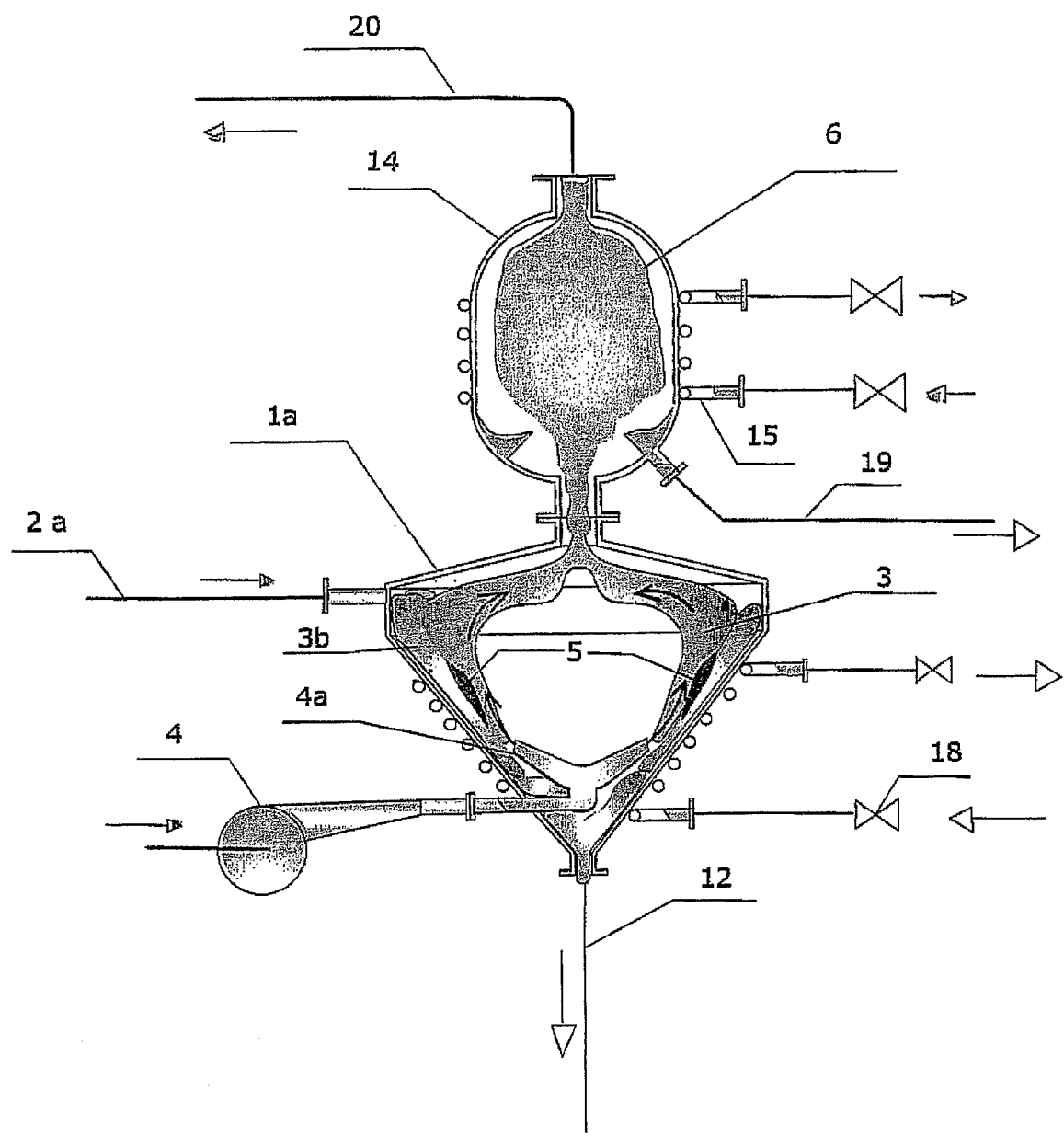
FIG. 5 shows a schematic and partial cross sectional view of a hydrocyclone in which the process according to the present invention is carried out.

FIG. 5 shows in schematic fashion a processing installation for dehydration and degasification of crude petroleum with water in emulsion and dissolved gas, that is, crude petroleum to be processed 2, which is introduced into a hydrocyclone 1A, such as that shown in FIG. 4, but the hydrocyclone 1A being an independent piece of equipment, that is, in this embodiment the closed processing tank 1 was eliminated, everything else being as described for the embodiment of FIG. 4 as regards the functioning of the hydrocyclone 1A.

The dehydrated and degasified oil will leave the hydrocyclone 1A via the outlet pipe 12 for further processing.

Figure 6:
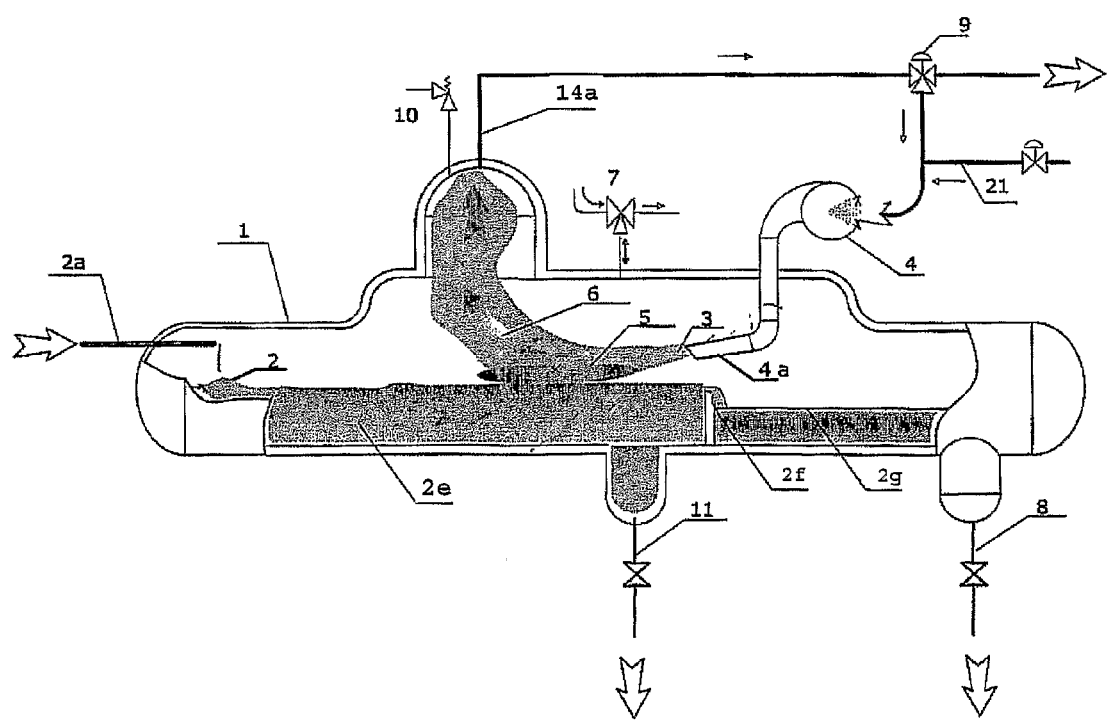
FIG. 6 shows a schematic and partial cross sectional view of another installation to carry out the process according to the present invention.

FIG. 6 shows schematically a processing installation including a three-phase separator, for dehydration and degasification of crude petroleum with water in emulsion and dissolved gas, that is, the crude petroleum to be processed 2, in which, according to the background art, the crude petroleum 2 is introduced into the closed processing tank 1 by the inlet pipe 2a, the crude petroleum moving through the zone 2e as far as the retention plate 2f, where the crude petroleum thanks to its lesser density will go on to the part 2g of the separator, leaving by the outlet pipe 8. The water, thanks to its greater density, will go to the bottom of zone 2e, from which it will exit by the bottom pipe 11. The dissolved gas will be separated slowly and will exit by the bottom pipe 11. In order to adapt this installation for implementation of the process per the present invention and to make more efficient and rapid the separation of the liquids in emulsion and dissolved gases, there were added to this installation a compressor 4, an injector 4a, a three-way control valve 9.

The current of the processing gas 3, compressed by the compressor 4, is projected by the injector 4a onto and tangentially to the free surface of the crude petroleum, the current of the processing gas 3 making a particular angle with the free surface of the crude petroleum before reaching the surface, which angle can vary between zero and thirty degrees, the angle being preferably between 0 and 8 degrees, but preferably five degrees. The compressor 4 is fed by the actual gas present in the tank 1 or by compatible gas coming from outside 21. The selection occurs by the three-way control valve 9. In the zone of influence of the current of the processing gas 3 there is generated a localized zone of reduced pressure 5 above the surface of the crude petroleum.

In the localized zone of reduced pressure 5, the gas and water in emulsion will separate from the crude petroleum 2 with a speed that depends on the velocity of the processing gas 3, which creates the partial vacuum on the interface with the crude petroleum being stored, and a gaseous mixture 6 will be formed, which will leave the tank by the pipeline 20 for further processing. The petroleum will also be separated more rapidly from the water, due to the creation of the localized partial vacuum. The gas above the free surface of the crude petroleum will be maintained at the service pressure prevailing inside the closed processing tank 1, by the action of the pressure regulating valve 7 and by the overpressure rapid relief valve 10, which is current practice in the oil industry.

Figure 7:
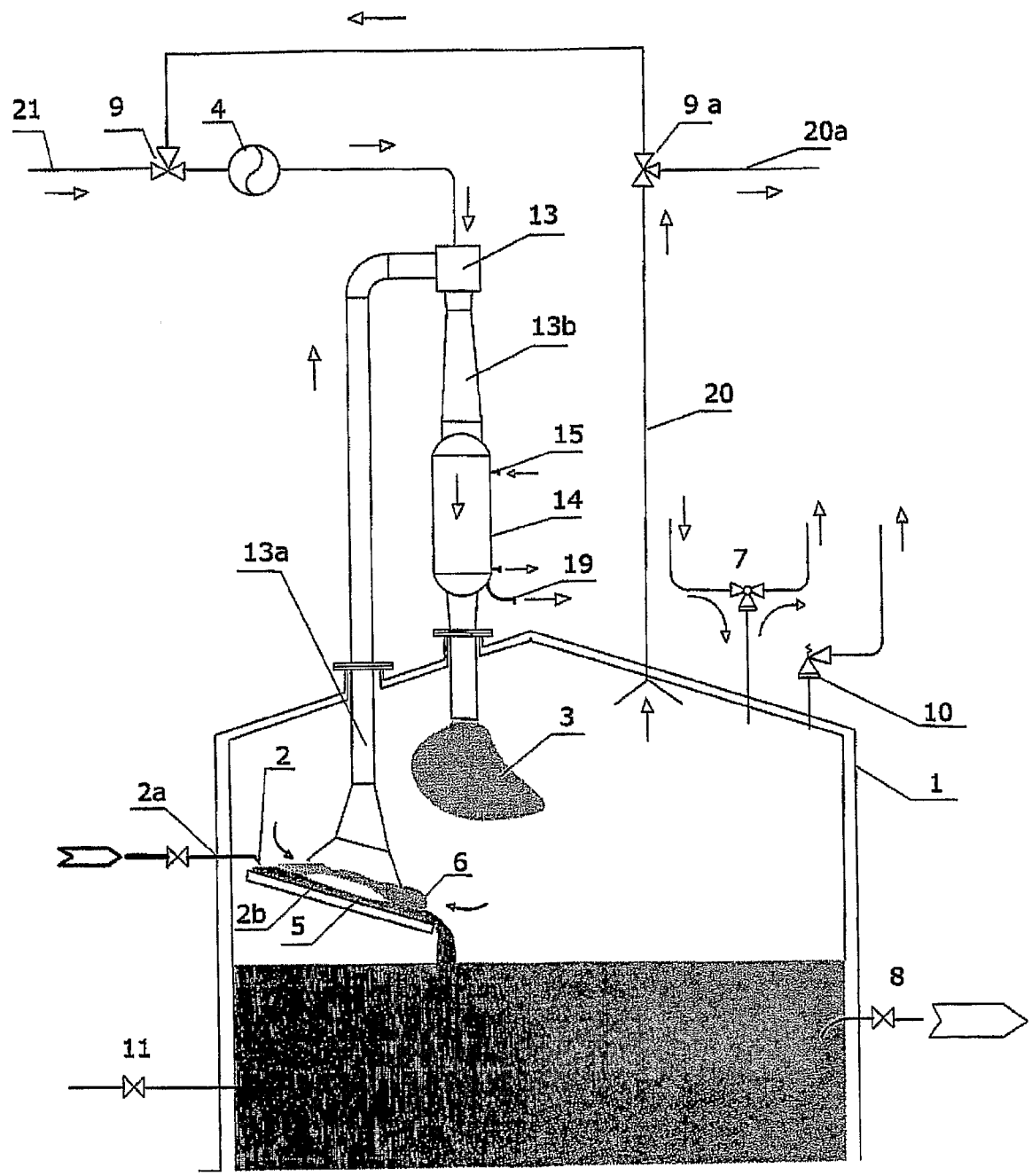
FIG. 7 shows a schematic and partial cross sectional view of yet another installation to carry out the process according to the present invention.

FIG. 7 shows in schematic fashion a processing installation for dehydration and degasification of crude petroleum with water in emulsion and dissolved gas, that is, crude petroleum to be processed 2, which is introduced into the closed processing tank 1 by the inlet pipe 2a, being then dispersed on a plate 2b, as it enters the tank. The crude petroleum is stored until the time it leaves through the outlet pipe 8, in static or dynamic manner.

There is then created by the intake nozzle 13a of a venturi 13 a localized zone of reduced pressure 5 on the free surface of the crude petroleum 2, dispersed on the plate 2b, the outside gas 21 being used as driving fluid in the venturi to bring about the aspiration responsible for the localized zone of reduced pressure 5. The outside gas can be supplied from some of the process gas present in the tank 1 after its recycling through the exchanger 14 via the pipe 20 and the three-way valve 9.

The processing gas, after going through the aspiration zone of the venturi 13a, entrains the gaseous mixture 6 formed by the liberation of the gas dissolved in the crude petroleum and the gas present in the closed processing tank 1. The gaseous mixture 6 goes on to the exchanger 14. The exchanger 14 receives a gaseous mixture 6 via the pipeline 13b, which is cooled by an outside refrigerant 15. The condensates of the exchanger 14 are sent on through the pipe 19 for subsequent processing, while the gas 3 coming from the exchanger 14 is supplied to the tank 1. If necessary, depending on the volume of gas liberated in 5, part of the gas returned to the tank will be recirculated entirely or partially by the compressor 4 via the pipeline 20 and the three-way valve 9a or it can be exported in whole or in part for subsequent processing 20a.

The gas above the free surface of the crude petroleum will be maintained at the service pressure prevailing inside the closed processing tank 1, by the action of the pressure regulating valve 7 and the overpressure rapid relief valve 10, which is the current practice in the oil industry.

The water separated will drop slowly by gravity to the bottom of the tank and will be drained in usual manner into the storage tanks of the oil industry by the bottom pipe 11.

The degasified and dehydrated oil will leave the closed processing tank 1 by the outlet pipe 8 for further processing or exporting.

There are described above embodiments which are considered most illustrative of the invention, although modifications are clearly possible, it being possible, for example, in the embodiment of FIG. 3, for the crude petroleum 2 to be dispersed directly onto the plate 2b, or in the embodiment of FIG. 7 the plate 2b can be mounted in a float, the aspiration nozzle 13a can be connected to its respective pipe and to the plate 2b, so as to follow the change in level of the petroleum within the tank 1, and the inlet pipe 2a for the crude petroleum 2 can be flexible and be connected to the plate 2b so that it can also follow the change in level of the petroleum within the tank 1.

Without departing from the scope of the invention, it is possible for a materials expert to realize all the modifications and improvements suggested by normal experience and the natural progress of engineering, in the process and device for implementing of the process of the present invention.

The invention claimed is:

1. A method for dehydration and degasification of crude petroleum solutions or emulsions with water, contained into a closed processing tank so as to obtain water with necessary characteristics for injection without pollution of underground aquifers, and acceleration of settling of the water in a lower part of an emulsion or solution, the method comprising:
   compressing a processing gas;
   generating a current of the compressed processing gas; and
   projecting the current of the processing gas tangentially along and onto a free surface of the emulsion or solution to be processed over a localized zone within the closed processing tank without affecting an overall pressure inside the closed processing tank, thus creating a localized zone of reduced pressure on a part of the free surface of the emulsion or solution to be processed within the closed processing tank, wherein
   the current of the processing gas makes an angle, before contacting the free surface of the emulsion or solution, which varies between zero and thirty degrees, the pressure reduction bringing about rapid separation of fluids in the emulsion or solution.

2. A process of claim 1, wherein the angle of the current of processing gas, before coming into contact with the free surface of the emulsion or solution, varies between zero and eight degrees.

3. A process of claim 1, wherein the processing gas is a recycled gas coming from the emulsion or solution to be processed, another gas compatible with the process, or an inert gas, coming from a source outside of the emulsion or solution to be processed.

4. A process of claim 1, wherein the localized zone is determined by a surface of a plate, which is arranged outside of the free surface of the remaining liquid stored within the closed processing tank, on which the emulsion or solution to be processed is sprinkled and drains off.

5. A process of claim 4, wherein the projecting of the current of processing gas has either an opposite current or is concurrent with the emulsion or solution to be processed, which is sprinkled and drains off the plate.

6. A device to implement the process according to claim 1, comprising:
   a closed processing tank;
   a compressor device for processing gas;
   an injector for injecting the processing gas compressed by the compressor device;
   a pipeline to take the processing gas from the compressor device to the injector;
   a pressure regulating valve;
   an inlet for the emulsion or solution to be processed; and
   an outlet for the treated liquid and an outlet for liquid separated by gravity in the closed processing tank,
   wherein the injector is oriented relative to the free surface of the emulsion or solution inside the closed processing tank to project a current of the processing gas tangentially along and onto the free surface of the emulsion or solution present inside the closed processing tank onto the localized zone of the free surface of the emulsion or solution, the current of processing gas making an angle before contacting the surface, which angle varies between zero and thirty degrees.

7. A device according to claim 6, wherein the free surface of emulsion or solution on which is created a localized zone of reduced pressure is defined by a plate on which the emulsion or solution is dispersed, the surface being planar or curved.

8. A device according to claim 7, wherein the surface of the plate is wavy or corrugated so as to increase contact surface with the emulsion or solution to be processed in the localized zone of reduced pressure.

9. A device according to claim 7, wherein the plate is heated by an external heating device, enabling a more rapid evaporation of the emulsion or solution and or gases with lower evaporation temperatures.

10. A device according to claim 7, wherein the plate is combined with one or more floats.

11. A device according to claim 7, wherein the surface of the plate receives the emulsion or solution to be processed directly from outside the closed processing tank.

12. A device according to claim 7, wherein the surface of the plate receives the emulsion or solution to be processed directly, by recirculation, from inside the closed processing tank.

13. A device according to claim 6, comprising a plurality of plates.

14. A device according to claim 6,
   wherein the closed processing tank is a hydrocyclone,
   wherein the emulsion or solution to be treated is centrifuged, and
   wherein the injector for projecting the processing gas being compressed is an annular injector oriented in relation to the free surface of the emulsion or solution moving within the hydrocyclone to project a current of the processing gas tangentially along the free surface onto a part of the free surface, the current of processing gas making an angle before coming into contact with the surface, which angle varies between zero and thirty degrees.

15. A device to implement the process according to claim 1, comprising:
   a closed processing tank;
   a compressor device for processing gas;
   a Venturi static machine, whose driving fluid is a processing gas and/or compatible outside gas, compressed by the compressor device;
   a pipe to take the processing gas to the compressor device, which will inject the processing gas as the driving fluid into the Venturi static machine;
   a heat exchanger, at the outlet of the Venturi static machine, for processing the gaseous mixture coming from the Venturi static machine;
   a pressure regulating valve;
   an inlet for the emulsion or solution to be treated; and
   an outlet for the treated emulsion or solution and an outlet for emulsion or solution separated by gravity, wherein one end of an aspiration pipe of the Venturi static machine is arranged above a part of the free surface of the emulsion or solution inside the closed processing tank to project a current of the processing gas tangentially along and onto the free surface of the emulsion or solution.

16. A process of claim 1, wherein the free surface is an upper surface of the emulsion or solution to be processed.

17. A method for dehydration and degasification of crude petroleum solutions or emulsions with water, contained into a closed processing tank so as to obtain water with necessary characteristics for injection without pollution of underground aquifers, and acceleration of settling of the water in a lower part of an emulsion or solution, the method comprising:

projecting the current of the processing gas tangentially along and onto a free surface of the emulsion or solution to be processed over a localized zone within the closed processing tank without affecting an overall pressure inside the closed processing tank, thus creating a localized zone of reduced pressure on a part of the free surface of the emulsion or solution to be processed within the closed processing tank, wherein the creating the localized zone of reduced pressure is achieved by applying an end of an aspiration pipe of a Venturi static machine on the free surface of the emulsion or solution to be processed, the processing gas or an outside gas being used as a driving fluid in the Venturi static machine.

18. A process of claim 17, wherein the processing gas used to achieve a localized zone of reduced pressure, after passing over the surface of the emulsion or solution and being saturated with vapors and gases liberated, is evacuated from the closed processing tank for subsequent processing or storage.

19. A process of claim 17, wherein the processing gas used to achieve a localized zone of reduced pressure, after passing an intake zone of the Venturi static machine, is saturated with the vapors liberated and is evacuated from the closed processing tank for subsequent processing or storage.

* * * * *